United States Patent [19]
Prosser et al.

[11] 3,791,469
[45] Feb. 12, 1974

[54] APPARATUS FOR TOWING SKIERS

[76] Inventors: Forrest A. Prosser, Rt.1, Chanute, Kans. 66720; Leroy E. Everitt, Box 273, Girard, Kans. 66743

[22] Filed: Mar. 2, 1972

[21] Appl. No.: 231,224

[52] U.S. Cl.................... 180/6 R, 74/486, 74/489, 180/6.2, 180/19 H
[51] Int. Cl...................... B62d 51/04, B62m 27/02
[58] Field of Search.... 180/1 G, 5 R, 6 R, 6.2, 9.22, 180/19 R, 19 S, 19 H; 74/486, 487, 488, 489, 543; 188/158, 170; 280/11.37 W

[56] References Cited
UNITED STATES PATENTS

| | | | |
|---|---|---|---|
| 2,069,578 | 2/1937 | Eaton............................. | 188/158 X |
| 1,593,876 | 7/1926 | Learmont ......................... | 74/486 |
| 3,029,887 | 4/1962 | Schantz............................ | 180/19 R |
| 3,444,945 | 5/1969 | Coordes et al................... | 180/19 H |
| 1,512,072 | 10/1924 | Williamson....................... | 74/486 |
| 1,774,451 | 8/1930 | Norelius.......................... | 74/489 |
| 2,270,431 | 1/1942 | Freeman.......................... | 188/170 |

FOREIGN PATENTS OR APPLICATIONS

| | | | |
|---|---|---|---|
| 499,819 | 2/1954 | Canada............................ | 180/5 R |
| 610,279 | 10/1960 | Italy................................. | 180/19 R |
| 1,169,880 | 9/1958 | France............................. | 180/9.22 |

Primary Examiner—David Schonberg
Assistant Examiner—Leslie J. Paperner
Attorney, Agent, or Firm—Dunlap, Laney, Hessin & Dougherty

[57] ABSTRACT

Apparatus for towing skiers including a wheeled, engine-driven vehicle having a telescoping boom extending rearwardly therefrom, the boom carrying throttle and brake controls for controlling the speed of the vehicle, and connected to steering control means for steering the vehicle upon rotation of the boom about its longitudinal axis. At its end opposite the vehicle, the telescoping boom carries hand controls connected to the throttle and brake controls to permit a skier towed behind the vehicle to remotely control the speed of the engine.

10 Claims, 10 Drawing Figures

PATENTED FEB 12 1974 3,791,469
SHEET 1 OF 2
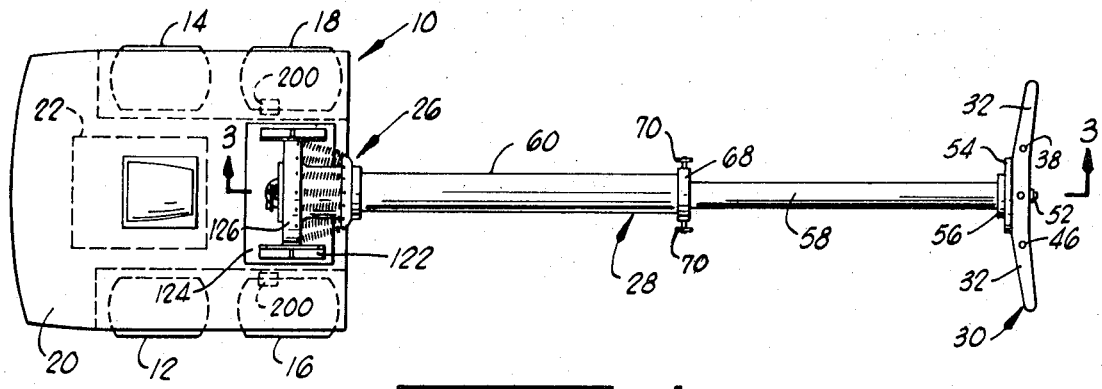
FIG. 1
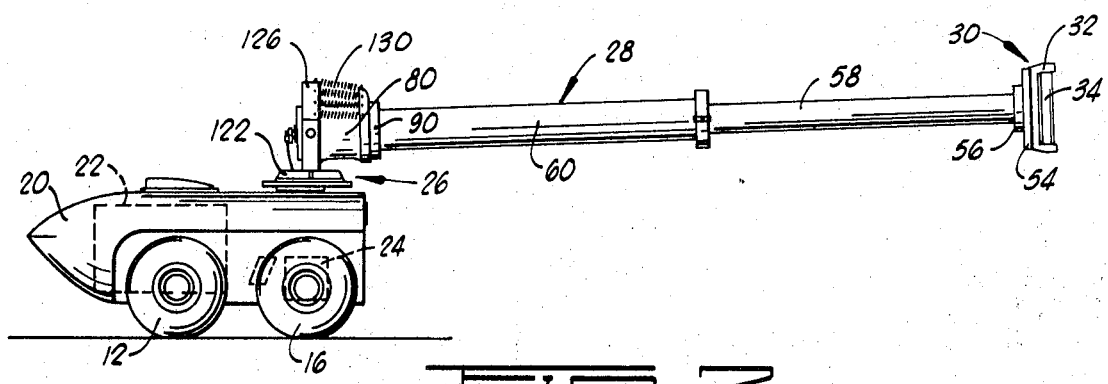
FIG. 2
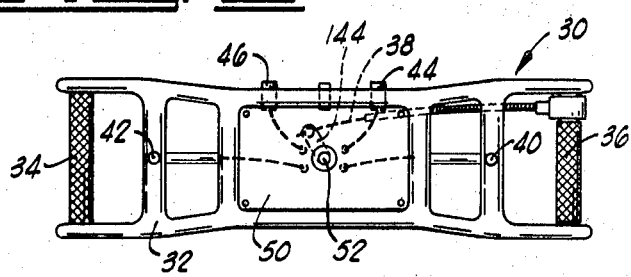
FIG. 4
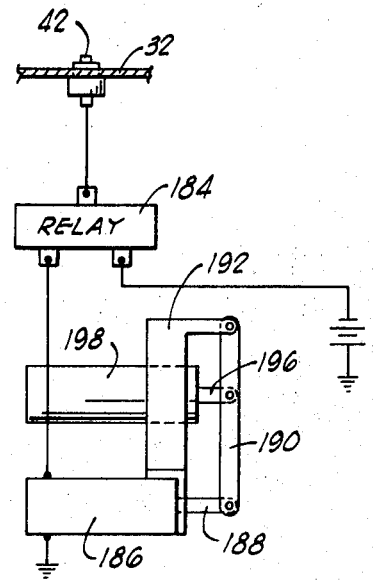
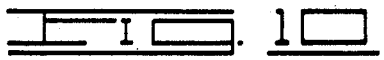
FIG. 10

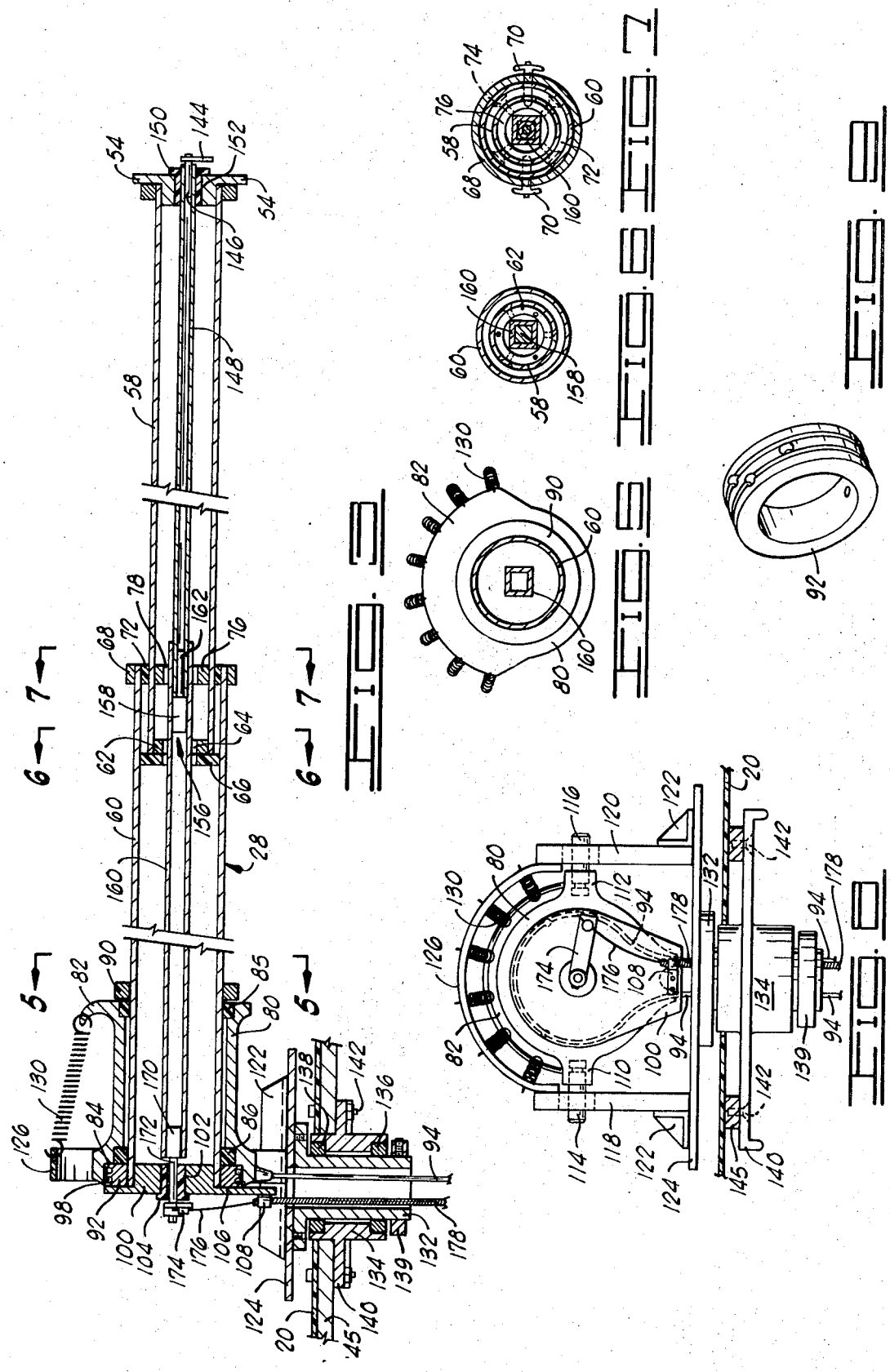

APPARATUS FOR TOWING SKIERS

BACKGROUND OF THE INVENTION

1. Field of the Invention

This invention relates to self-propelled vehicles, and more particularly, relates to a vehicle specially adaptd for traversing snow-covered terrain and for towing behind it a skier.

2. Brief Description of the Prior Art

Various proposals have previously been advanced for providing a self-propelled vehicle for towing a skier across a relatively flat snow-covered landscape for recreational purposes. For example, U.S. Pat. No. 3,193,038 depicts and describes a monowheel ski-tow device in which a throttle control is provided in a handle bar located on the outer end of a double boom elongated handle assembly 17. Other patents which disclose devices of this type are British Pat. No. 1,042,943; French Pat. No. 1,169,880; Finnish Pat. No. 41,807; Canadian Pat. No. 499,819; Italian Pat. No. 479,495 and Swiss Pat. No. 281,002.

BRIEF DESCRIPTION OF THE PRESENT INVENTION

The present invention provides an improved, versatile, self-propelled vehicle for towing a skier therebehind, which vehicle is adapted to permit the skier to maintain perfect control over the movements and speed of the vehicle at all times, and may be used more safely than vehicles of this type previously proposed.

Broadly described, the present invention comprises a self-propelled vehicle which includes at least one front wheel and a pair of rear wheels, with a housing supported on the wheels. An engine is mounted in the housing for driving the rear wheels. An elongated, telescoping boom having one end movably connected to the housing extends outwardly from the self-propelled vehicle for towing a skier therebehind. Steering means is connected between the boom and the self-propelled vehicle for steering the vehicle upon movement of the boom relative to the housing. Throttle means extends through the boom over its length, and has one end connected to the engine, and further includes a manual throttle control at the opposite end of the boom from its end connected to the housing. Means is provided for braking the self-propelled vehicle, including a manually actuated brake energizing device disposed at the opposite end of the boom from the end connected to the housing.

In a preferred embodiment of the invention, the telescoping boom is connected to the housing of the self-propelled vehicle for pivotal movement about a horizontal axis, pivotal movement about a vertical axis, and rotational movement about the longitudinal axis of the telescoping boom. The latter movement is used to effect steering of the vehicle through disc brakes operating upon opposite sides of differential gearing connected between the engine and the rear wheels.

A broad object of the invention is to provide a self-propelled vehicle adapted for towing skiers over snow-covered terrain.

Another more specific object of the invention is to provide a snow traversing vehicle having a telescoping towing boom extending therefrom, and carrying controls enabling a skier at the remote end of the boom to finely control the speed and direction of movement of the vehicle.

A further object of the invention is to provide a self-propelled tow vehicle for towing a skier at the end of a boom in such a way that the skier can change direction and position relative to the vehicle without altering the course of the vehicle.

Yet another object of the invention is to provide a self-propelled vehicle and associated boom assembly for towing a skier over snow, which vehicle and boom, when not in use can be easily disassembled, or can be altered to a compact form for storage.

Other objects and advantages of the invention will become apparent as the following detailed description of a preferred embodiment of the invention is read in conjunction with the accompanying drawings which illustrate the invention.

BRIEF DESCRIPTION OF THE DRAWINGS

FIG. 1 is a plan view of the vehicle and boom of the invention, with the boom shown extended, and certain parts disposed within the housing of the vehicle shown in dashed lines.

FIG. 2 is a side elevation view of the vehicle and boom as shown in FIG. 1.

FIG. 3 is an enlarged sectional view taken along line 3—3 of FIG. 1.

FIG. 4 is a view in elevation of the control handle provided at one end of the boom in the present invention.

FIG. 5 is a sectional view taken along line 5—5 of FIG. 3.

FIG. 6 is a sectional view taken along line 6—6 of FIG. 3.

FIG. 7 is a sectional view taken along line 7—7 of FIG. 3.

FIG. 8 is a view, partly in elevation, and partly in section, showing the mounting arrangement of the boom on the vehicle as such mounting arrangement appears looking rearwardly from the vehicle housing toward the boom.

FIG. 9 is a perspective view of a steering cable control ring forming a part of the invention.

FIG. 10 is an electro-mechanical circuit diagram showing the electric-hydraulic brake structure used in the invention.

DETAILED DESCRIPTION OF A PREFERRED EMBODIMENT OF THE INVENTION

Referring initially to FIG. 1 of the drawings, the self-propelled vehicle forming a part of the present invention includes a plurality of ground engaging wheels which, in the preferred embodiment, include a pair of front wheels 12 and 14 and a pair of rear wheels 16 and 18. The wheels are interconnected by suitable axles (not shown) and support a suitable frame (not shown) upon which is mounted a housing 20. Mounted within the housing is an internal combustion engine shown in dashed lines and designated by reference numeral 22. In addition to driving the front wheels 12, the engine drives the rear wheels 16 and 18 through a differential 24, which differential is disposed below a boom mounting subassembly designated generally by reference numeral 26. The boom mounting subassembly 26 is used for mounting an elongated telescoping boom 28 on the self-propelled vehicle 10. At the end of the boom 28, a control handle subassembly 30 is mounted.

Referring now in detail to the control handle subassembly 30, this assembly includes an elongated rigid frame 32 of the configuration depicted in FIGS. 1 and 4. At its outer ends, the frame 32 carries a pair of hand grips 34 and 36. The hand grip 34 is rigid and stationary, whereas the hand grip 36 is mounted in the frame 32 for rotation about a vertical axis. The hand grip 36 functions as a manual throttle control, and is attached at its upper end to a Bowden cable control wire 38 which is reciprocated upon rotation of the hand grip 36. Also mounted on the frame 32 is a kill button 40 for electrically shorting the engine 22 in order to kill the engine when desired. An electric brake switch button 42 is mounted on the opposite side of the frame 32 for depression by the thumb for applying the electric-hydraulic brakes on the self-propelled vehicle 10 in a manner hereinafter described.

Mounted on top of the rigid frame 32 are a right turn signal button 44 and a left turn signal button 46 for the purpose of illuminating turn indicator lights carried on the self-propelled vehicle 10. Finally, mounted on a plate 50 attached to the center of the frame 32 is a horn button 52.

The control handle subassembly 30 is mounted on the telescoping boom 28 by means of a mounting plate 54 so that the mounting plate 54 and control handle subassembly 30 rotate together. There is further provided an aluminum retaining ring 56 which is secured to the mounting plate 54 and is keyed to an interior or secondary tube 58 of the telescoping boom 28. The secondary or interior tube 58 is an elongated, hollow tube which is preferably formed of a light material such as aluminum. The secondary tube 58 extends telescopingly into a primary or exterior tube 60. The manner in which the secondary tube 58 is telescoped within the primary tube 60 is best illustrated in FIGS. 1, 3, 6 and 7. Thus, the end of the secondary tube 58 opposite the control handle subassembly 30 carries an aluminum ring 62 which has an opening 64 formed in the center thereof. Secured to the end of the secondary tube 58 and against the aluminum ring 62 is a high density synthetic resin wear ring 66 having a low coefficient of friction which forms a bearing between the secondary tube 58 and the primary tube 60 to permit the secondary tube to slide within the primary tube.

At the end of the primary tube 60 which is remotely located with respect to the self-propelled vehicle 10, the primary tube carries a ring 68 which may be secured to the primary tube by bolting, welding or other suitable method. The ring 68 carries a pair of apertures on opposite sides thereof which are aligned with apertures in the primary tube 60 to pass pin and ball locking members 70 used to engage the primary tube with the secondary tube. Positioned inside the exterior tube 60 in bearing engagement with the interior tube 58 is a synthetic resin wear ring 72 which has apertures aligned with those formed through the primary tube 60 and the ring 68. The synthetic resin wear ring 72 is secured by suitable screws 74 to the secondary tube 58 as shown in FIG. 7. Apertures are provided in the secondary tube in alignment with the apertures in the wear ring 72, primary tube 60 and ring 68 to accomodate the pin-ball locking members 70 in the manner best illustrated in FIG. 7. When the pin-ball locking members 70 are extended into the locking position shown in FIG. 7, spring biased balls are resiliently urged outwardly at the interior ends of these locking members to retain the locking members in position and secure the secondary tube 58 against sliding movement in the primary tube 60. When the pin-ball locking members 70 are removed, the secondary tube 58 may then be telescoped freely in the primary tube 60. Finally, a rigid ring 76 is secured inside the secondary tube 58 for receiving the inner ends of the screws 74, the inner ends of the pin-ball locking members 70, and for providing a guide (in the form of an aperture 78 formed in the center thereof) for a throttle subassembly as hereinafter described.

The boom mounting subassembly 26 used for movably connecting the telescoping boom 28 to the self-propelled vehicle 10 is illustrated in detail in FIGS. 3, 5 and 8. The boom mounting assembly includes a casting 80 which has a bore therethrough for receiving the primary tube 60 of the telescoping boom 28. The shape of the casting can best be discerned by referring to FIGS. 1, 2 and 3. As illustrated, the casting is provided with a forwardly turned flange 82 at the rear, upper side thereof, and with a counterbore 84 at the forward end thereof. A pair of high density synthetic resin, low coefficient of friction, bearing rings 85 and 86 are used to journal the primary tube 60 within the casting 80 so that the tube may rotate within this casting. A retainer ring 90 secured around the primary tube 60 prevents axial movement of the primary tube within the casting 80.

Mounted within the counterbore 84 of the casting 80 is a steering cable control ring 92. The steering cable control ring 92 is illustrated in perspective view in FIG. 9. This control ring 92 is keyed to the primary tube 60 for rotation therewith, and is provided with a pair of peripheral, circumferentially extending grooves 92a and 92b for the accomodation of a pair of steering cables 94. The steering cables 94 are adapted to be connected to a pair of disc brakes located on opposite sides of the differential 24 for steering the self-propelled vehicle 10 by braking one or the other of the rear wheels 16 or 18, as more specifically hereinafter described. At its outer periphery, the cable control ring 92 preferably carries a plurality of bearings 98 so that it may turn freely within the casting 80.

Pressed into the forward end of the primary tube 60 is a throttle control mounting plate 100. The throttle control mounting plate 100 has a central bore 102 formed therethrough for receiving a high density, synthetic resin bearing 104 through which a throttle rod is passed as hereinafter explained. The throttle control mounting plate 100 also is provided with a downwardly extending flange 106 which carries adjacent its lower edge, a throttle bracket 108 which slidingly accomodates a throttle cable as hereinafter described.

On its opposite sides, the casting 80 carries a pair of horizontally projecting trunnion shoulders, 110 and 112 (see FIG. 8). The trunnion shoulders 110 and 112 function to receive the inner ends of stub shafts 114 and 116, respectively, which stub shafts extend into journals carried by upright mounting posts 118 and 120. The mounting posts 118 and 120 are strengthened by angle brackets 122 which are welded to the upper side of a base plate 124 (see FIGS. 3 and 8). Secured between the upper ends of the posts 118 and 120 is an arcuate spring anchor plate 126. The spring anchor plate 126 has a plurality of apertures spaced over its length for receiving one end of a plurality of tension springs 130. The opposite ends of the tension springs 130 are extended through apertures formed in the forwardly turned flange 82 forming a portion of the casting 80.

For the purpose of permitting the telescoping boom 28 to be pivoted about a vertical axis, the base plate 124 is bolted to the upper end of a tubular carrier casting 132. The carrier casting 132 is generally cylindrical, has a large bore extending through the center thereof, and projects downwardly through a central bore which is formed in a mounting sleeve 134. The carrier casting 132 is journaled in the mounting sleeve 134 by a plurality of suitable annular bearings 136 and 138 and retained in the sleeve 134 by a retainer ring 139. The mounting sleeve 134 is provided with a radially outwardly extending flange 140 which is bolted by bolts 142 to support straps 145 secured to the housing 20 of the self-propelled vehicle 10.

The throttle subassembly of the invention includes the rotatable hand grip 36 and the Bowden cable 38. The Bowden cable 38 is connected at its end opposite the hand grip 36 to one end of a throttle lever 144 which has its other end secured to a steel rod 146. The steel rod 146 is pressed into the bore of an aluminum secondary throttle tube 148 which extends co-axially within the secondary tube 58 of the telescoping boom 28. The throttle tube 148 passes through a high density, synthetic resin bearing 150 which is pressed into a bore 152 located precisely in the center of the mounting plate 54. The external periphery of the secondary throttle tube 148 is round so that the throttle tube can rotate within the high density, synthetic resin bearing 150.

At its end opposite the end which receives the steel rod 146, the throttle tube 148 is connected to a tube adapter 156. The tube adapter 156 includes a square cross-sectioned base 158 which is slidingly disposed in a square cross-sectioned primary throttle tube 160, having a square cross-sectioned bore therethrough so that the tube adapter turns with the primary throttle tube 160 about its longitudinal axis. The tube adapter 156 further has a projection 162 which is keyed to the secondary throttle tube 148 for rotation about the longitudinal axis of this throttle tube. The secondary throttle tube 148 has an outside diameter which permits it to enter and slide within the primary throttle tube 160.

It will be noted in referring to FIG. 3 of the drawings that one end of the primary throttle tube 160 passes through enlarged bores formed in the ring 66, the ring 62 and the ring 76. At its opposite end, the primary throttle tube 160 receives the square cross-sectioned end of a rod 170 having a solid cylindrical projection 172 which projects through the small centrally located bore of the high density, synthetic resin bearing 104. It is important to note that the rod 170 and its projection 172 extend precisely along the longitudinal axis of the telescoped primary and secondary tubes 60 and 58 of the elongated telescoping boom 28.

At its end on the opposite side of the bearing 104 from the primary throttle tube 160, the projection 172 of the rod 170 is secured to a throttle lever 174. The throttle lever 174 has attached to the outer end thereof, one end of a Bowden cable 176 which extends into a cable sheath 178 held by the throttle bracket 108.

In FIG. 10 of the drawings, the electric-hydraulic brake system of the invention is schematically illustrated. This system includes the brake button 42, mounted on the frame 32 of the hand control subassembly 30, which button actuates a switch in electrical circuitry which includes the relay 184 and the solenoid 186. The armature 188 of the solenoid 186 is connected to a linkage 190 which is pivotally supported by a stationary bracket 192 mounted in the vehicle housing 20. The linkage 190 is pivotally connected intermediate its length to a piston rod 196 connected to the piston (not visible) within hydraulic brake cylinder 198. Actually, the system depicted in FIG. 10 is duplicated to provide a second brake operative with respect to the second rear wheel of the vehicle.

DESCRIPTION

In the operation of the apparatus of the invention, the engine 22 is initially started. The engine 22 drives the four wheels of the vehicle, and the drive includes the differential 24. As the self-propelled vehicle moves forward, a skier to be towed by the vehicle grasps the control handle subassembly 30 by gripping the hand grips 34 and 36. The hand grip 36 constitutes the throttle control means, and by rotating this hand grip, the Bowden cable 38 is reciprocated to cause the throttle lever 144 to be pivoted about the longitudinal axis of the rod 146. This rotates the rod which, in turn, rotates the secondary throttle tube 148. Rotation of the secondary throttle tube 148 also rotates the primary throttle tube 160 and the rod 170. This causes pivotation of the throttle lever 174 about the longitudinal axis of the primary throttle tube 160, and results in the Bowden cable 176 being reciprocated within the cable sheath 178. This motion is, in turn, transmitted to the throttle control on the engine 22 so that the engine may be accelerated or throttled down in response to actuation of the rotatable hand grip 36.

It should be pointed out that the boom mounting assembly 26 utilized for movably mounting the telescoping boom 28 on the self-propelled vehicle 10 permits the height of the control handle subassembly 30 to be adjusted to the height of the skier. Thus, the entire telescoping boom assembly may be pivoted upwardly or downwardly about a horizontal axis which extends through the stub shafts 114 and 116, which shafts are journalled in the upright posts 118 and 120.

As the vehicle moves over the snow-covered terrain towing the skier behind it, the skier may wish to ski from one side to the other, similar to skiing a slalom course, and may desire to do this without changing the heading or course of the self-propelled vehicle 10. Skiers will, of course, appreciate how such change of direction is accomplished in ordinary skiing, and the same manipulation of the skis is utilized to accomplish this movement using the self-propelled vehicle 10 and telescoping boom structure 28 of the present invention. As the skier moves to one side or the other of the line of travel of the self-propelled vehicle 10, the telescoping boom 28 may follow such movement by reason of the mounting of the carrier casting 132 within the sleeve 134 so as to permit pivotation of the boom mounting subassembly 26 about a vertical axis. It will be apparent from what is said hereinafter that the cable sheath 178, Bowden cable 176 and the two steering cables 94 are positioned closely enough to this vertical axis that no disruption of the throttle or steering controls of the apparatus is caused by the swivelling movement of the telescoping boom 28 about a vertical axis in the manner described.

In some instances, to avoid obstacles, or to follow a curving route, it may be desirable to change the heading or course of the self-propelled vehicle 10. To accomplish this maneuver, the skier twists or pivots the rigid frame 32 of the control handle subassembly 30 about the longitudinal axis of the telescoping boom 28. This movement of the rigid frame 32 will impart a rotational movement to the secondary tube 58 and to the primary tube 60 of the telescoping boom. Since the cable control ring 92 is secured around the outer periphery of the primary tube 60 of the telescoping boom 28, this cable control ring is rotated with the primary tube. Rotation of the cable control ring 92 in this manner results in an increase in tension in one of the steering cables 94 and a relaxing of the other steering cable. The result is that one of the disc brakes on one side of the differential 24 is set to lock the differential on that side, while permitting the other side of the differential to deliver the output drive to the other rear wheel. This, of course, has the effect of stopping the drive to one rear wheel and increasing the speed of rotation of the other rear wheel. The result will be a pivotation of the self-propelled vehicle 10 from one heading to a new heading.

If it is desired to brake or retard the speed of the self-propelled vehicle 10, the skier presses the electric brake button 42 mounted on rigid frame 32. The effect of this action is to close an electrical circuit to the relay 184, and thereby to energize the relay. Upon energization of the relay, the solenoid 186 is energized to retract the armature shaft 188. Ths motion pivots one end of the linkage 190 toward the solenoid 186, and causes the piston rod 196 to be retracted within the brake cylinder 198 so as to set brakes 200 disposed adjacent the rear wheels 16 and 18.

The kill button 40 which is provided on the frame 32 of the handle control subassembly 30 is merely a switch included in the electrical circuitry to the engine 22 so as to interupt the spark to the engine when the kill button is pushed to open such switch, and thus to stop the engine.

From the foregoing description of the invention, it will be seen that the present invention provides an apparatus for towing a skier over a snow-covered landscape in a manner which is safe, but which permits the skier a maximum amount of amusement and enjoyment because of the flexibility of control which is at his disposal. Although a preferred embodiment of the invention has been herein described in order to illustrate the principles of the invention, it will be understood that various changes and modifications can be effected in the described apparatus without departure from the basic principles upon which it is based. Changes and innovations of this type are therefore deemed to be circumscribed by the spirit and scope of the invention, except as the same may be necessarily limited by the appended claims or reasonable equivalents thereof.

What is claimed is:

1. Apparatus for towing a skier comprising:
  a self-propelled vehicle including:
    at least one front wheel;
    a pair of rear wheels;
    a housing supported on such wheels; and
    a motor mounted in said housing;
  an elongated, telescoping boom having one end movably connected to said housing;
  steering means connected between said boom and said self-propelled vehicle for steering said self-propelled vehicle upon movement of said boom relative to said housing;
  throttle means extending through said boom and having one end connected to said engine, said throttle means comprising:
    a telescoping tubular rod extending the length of said telescoping boom and including two telescoping, interengaging tubular parts keyed to each other for transmitting torque from one of said parts to the other, said tubular parts being positioned along the longitudinal axis of said telescoping boom and mounted in said boom for rotation about the longitudinal axis thereof;
    a rotating hand grip disposed at the other end of said boom from said housing;
    means for rotating said tubular rod about its longitudinal axis connected between said tubular rod and said hand grip; and
    a linkage connected to the end of said tubular rod adjacent said housing for rotation with said tubular rod about the longitudinal axis thereof, and adapted for connection to said engine; and
  means for braking said self-propelled vehicle, including a manually actuated brake energizing device disposed at said other end of said boom.

2. Apparatus for towing a skier comprising:
  a self-propelled vehicle including:
    at least one front wheel;
    a pair of rear wheels;
    a housing supported on said wheels; and
    a motor mounted in said housing;
  an elongated, telescoping boom having one end movably connected to said housing;
  a boom mounting assembly movably connecting said telescoping boom to said vehicle, said mounting assembly comprising:
    a casting having a central bore rotatably receiving the end of said boom;
    a pair of upright posts on opposite sides of said casting pivotally supporting said casting for pivotation about a horizontal axis;
    a carrier casting supporting said upright posts; and
    a mounting sleeve pivotally receiving said carrier casting for rotation of the carrier casting about a vertical axis, and mounted on said housing;
  steering means connected between said boom and said self-propelled vehicle for steering said self-propelled vehicle upon movement of said boom relative to said housing;
  throttle means extending through said boom and having one end connected to said engine, said throttle means further including a manual throttle control at the opposite end of said boom from its end connected to said housing; and
  means for braking said self-propelled vehicle including a manually actuated brake energizing device disposed at said opposite end of said boom from the end connected to said housing through said boom mounting assembly.

3. Apparatus for towing a skier comprising:
  a self-propelled vehicle including:
    at least one front wheel;
    a pair of rear wheels;
    a housing supported on said wheels; and
    a motor mounted in said housing;

an elongated telescoping boom having one end movably connected to said housing for movement in a vertical plane about a horizontal axis, for movement sideways about a vertical axis, and for rotation about the longitudinal axis of the boom;
a steering means connected between said boom and said self-propelled vehicle for steering said self-propelled vehicle upon movement of said boom relative to said housing;
throttle means extending through said boom and having one end connected to said engine, said throttle means comprising:
  telescoping tubular means extending the length of said telescoping boom and including a pair of telescoping, interengaging tubular parts keyed to each other for mutual rotation about a common longitudinal axis for transmitting torque from one of said tubular parts to the other, said tubular parts being positioned along the longitudinal axis thereof independently of the rotation of said boom about the longitudinal axis thereof;
  a moveable hand grip disposed at said other end of said boom;
  means for rotating the telescoping tubular means of said throttle means about its longitudinal axis connected between one of said telescoping tubular parts and said hand grip for rotating said one tubular part when said hand grip is moved; and
  linkage means connected between the end of said telescoping tubular means adjacent said housing and said engine for adjusting the speed of said engine when said telescoping tubular means is rotated about the longitudinal axis thereof; and
means for braking said self-propelled vehicle including a manually actuated brake energizing device disposed at said opposite end of the boom from the end connected to said housing.

4. Apparatus for towing a skier comprising:
a self-propelled vehicle including:
  a plurality of ground engaging wheels;
  a housing supported on said wheels; and
  a motor mounted in said housing;
an elongated, telescoping boom having one end movably connected to said vehicle for movement in a vertical plane about a horizontal axis, for movement sideways about a vertical axis, and for rotation about the longitudinal axis of the boom;
a boom mounting assembly moveably connecting the telescoping boom to said vehicle and including:
  a rigid member having a bore therein rotatably receiving the end of the boom;
  a pair of upright posts on opposite sides of said rigid member pivotally supporting said rigid member for pivotation about a horizontal axis;
  a carrier element supporting said upright posts; and
  a mounting sleeve pivotally receiving said carrier element for rotation of the carrier element about a vertical axis, and mounted on said housing;
steering means connected between said boom and said self-propelled vehicle for steering said self-propelled vehicle upon movement of said boom relative to said housing;
throttle means extending along said boom from one end thereof to the other, and having one of its ends connected to said engine and having a manual throttle control at the opposite end of said boom from its end connected to said engine; and
means for braking said self-propelled vehicle including a manually actuated brake energizing device disposed at said opposite end of the boom from the end connected to said housing.

5. Apparatus for towing a skier comprising:
a self-propelled vehicle including:
  a plurality of ground engaging wheels;
  a housing supported on said wheels; and
  a motor mounted in said housing;
an elongated, telescoping boom having one end movably connected to said housing, said boom being connected to said housing for movement in a vertical plane about a horizontal axis, for movement sideways about a vertical axis, and for rotation about the longitudinal axis of the boom;
steering means connected between said boom and said self-propelled vehicle for steering said self-propelled vehicle upon movement of said boom relative to said housing;
throttle means extending along the length of said boom and including:
  control means extending the length of said boom and including a pair of elongated, relatively slideable parts rotatably keyed to each other for mutual rotation about a common longitudinal axis, and axially slideable in relation to each other for extending and foreshortening the length of said control means, said control means being positioned along the longitudinal axis of the telescoping boom and mounted in the boom for rotation about the longitudinal axis thereof independently of the rotation of said boom about the longitudinal axis thereof;
  manually actuated means at the end of said boom remote from said housing for rotating said control means about its longitudinal axis; and
  linkage means connected between said engine and the end of said control means which is adjacent said housing, for adjusting the speed of said engine when said control means is rotated about the longitudinal axis thereof; and
means for braking said self-propelled vehicle including a brake energizing device disposed at said opposite end of said boom from the end thereof connected to said housing.

6. Apparatus for towing a skier comprising:
a self-propelled vehicle including:
  a plurality of ground engaging wheels; and
  a motor supported above and drivingly connected to said wheels;
an elongated, telescoping control boom;
a boom mounting assembly movably connecting one end of said elongated boom to said vehicle for movement of the boom in a vertical plane about a horizontal axis, for movement of the boom sideways about a vertical axis, and for rotation of the boom and about its longitudinal axis;
steering means connected between said boom and said self-propelled vehicle for steering said self-propelled vehicle upon rotation of said boom about its longitudinal axis;
throttle means extending through said boom and having one end connected to said engine, said throttle means further including a manual throttle control at the opposite end of said boom from its end connected to said self-propelled vehicle; and means for braking said self-propelled vehicle, including a manually actuated brake energizing device disposed at said opposite end of said boom from the end connected to said self-propelled vehicle through said boom mounting assembly.

7. Apparatus as defined in claim 6 wherein said steering means comprises:
 a cable ring mounted on said boom for rotation therewith about the longitudinal axis thereof; and
 cables secured to said ring and responsive to the rotation thereof for steering said vehicle.

8. Apparatus as defined in claim 6 wherein said throttle means comprises:
 a telescoping tubular rod extending the length of said telescoping boom and including two telescoping, interengaging tubular parts keyed to each other for transmitting torque from one of said parts to the other, said tubular parts being positioned along the longitudinal axis of said telescoping boom and mounted in said boom for rotation about the longitudinal axis thereof;
 a rotating hand grip disposed at said other end of said boom;
 means for rotating said tubular rod about its longitudinal axis connected between said tubular rod and said hand grip; and
 a linkage connected to the end of said tubular rod adjacent said housing for rotation with said tubular rod about the longitudinal axis thereof, and adapted for connection to said engine.

9. Apparatus as defined in claim 8 wherein said means for braking said self-propelled vehicle comprises:
 a pair of hydraulic brakes for braking a pair of said wheels and each including:
  a hydraulic cylinder;
  a piston reciprocably mounted in said cylinder;
  a piston rod secured to said piston and projecting from said cylinder;
 electrical circuitry including:
  said manually actuated energizing device;
  a pair of solenoids each of which is associated with one of said hydraulic brakes; and
  circuit means connected between said manually actuated energizing device and said solenoids for energizing said solenoids when said energizing device is actuated; and
 mechanical linkages interconnecting each of said solenoids to one of said piston rods for reciprocating said piston rods when said solenoids are energized.

10. Apparatus as defined in claim 9 and further characterized as including a control handle subassembly secured to said opposite end of said boom, said control handle subassembly comprising:
 a rigid frame extending transversely with respect to the longitudinal axis of said boom and secured to said opposite end of said boom; and
 hand grips at opposite ends of said frame, one of said hand grips constituting the rotating hand grip of said throttle means.

* * * * *